(12) United States Patent
Monsacre

(10) Patent No.: US 7,583,980 B2
(45) Date of Patent: Sep. 1, 2009

(54) ANTENNA COMMUNICATION METHOD FOR A CHIP CARD AND ASSOCIATED DEVICE

(75) Inventor: Olivier Monsacre, Bourg la Reine (FR)

(73) Assignee: STMicroelectronics S.A., Montrouge (FR)

( * ) Notice: Subject to any disclaimer, the term of this patent is extended or adjusted under 35 U.S.C. 154(b) by 175 days.

(21) Appl. No.: 10/526,033

(22) PCT Filed: Aug. 27, 2003

(86) PCT No.: PCT/FR03/02594

§ 371 (c)(1),
(2), (4) Date: Nov. 21, 2005

(87) PCT Pub. No.: WO2004/021271

PCT Pub. Date: Mar. 11, 2004

(65) Prior Publication Data

US 2006/0142063 A1    Jun. 29, 2006

(30) Foreign Application Priority Data

Aug. 30, 2002  (FR) ............................. 02 10794

(51) Int. Cl.
*H04M 1/00* (2006.01)

(52) U.S. Cl. .................. 455/558; 455/550.1; 455/551; 455/41.2

(58) Field of Classification Search ............ 455/550.1, 455/551, 558, 41.2; 235/379, 380, 382
See application file for complete search history.

(56) References Cited

U.S. PATENT DOCUMENTS 5,335,276 A * 8/1994 Thompson et al. .......... 380/266

5,598,032 A    1/1997  Fidalgo (Continued)

FOREIGN PATENT DOCUMENTS

EP    1 143 379 A1    10/2001

(Continued)

OTHER PUBLICATIONS

International Search Report from a corresponding International Application No. PCT/FR03/02594 filed Aug. 23, 2003.

*Primary Examiner*—Lester Kincaid
*Assistant Examiner*—Sayed T Zewari
(74) *Attorney, Agent, or Firm*—Lisa K. Jorgenson; James H. Morris; Wolf, Greenfield & Sacks, P.C.

(57) ABSTRACT

The invention relates to a communication method comprising the following steps consisting in: using a device which is equipped with at least one antenna and at least two contacts which are connected to the antenna; using a chip card comprising a chip which is equipped with at least two surface contacts, a processing module and a radio frequency interface which is associated with said processing module and which is connected to the surface contacts of the card, the surface contacts of the card being connected to the contacts of the device; and transmitting electric signals between the surface contacts of the card and the antenna. The invention can be used, in particular, to increase the communication range of the chip card. The invention also relates to an associated chip card and device.

13 Claims, 2 Drawing Sheets

U.S. PATENT DOCUMENTS

| | | | |
|---|---|---|---|
| 5,778,322 A * | 7/1998 | Rydbeck | 455/558 |
| 6,111,303 A * | 8/2000 | Launay | 257/531 |
| 6,434,403 B1 * | 8/2002 | Ausems et al. | 455/556.2 |
| 2001/0006902 A1 * | 7/2001 | Ito | 455/558 |

FOREIGN PATENT DOCUMENTS

| | | |
|---|---|---|
| GB | 2 309 108 A | 7/1997 |
| GB | 2 358 991 A | 8/2001 |
| JP | 2002-236901 | 8/2002 |
| WO | WO 02/056247 A1 | 7/2002 |

* cited by examiner

ANTENNA COMMUNICATION METHOD FOR A CHIP CARD AND ASSOCIATED DEVICE

BACKGROUND OF THE INVENTION

1. Field of the Invention

The invention relates to smart cards, and particularly communication processes between a smart card and an external unit.

Smart cards are becoming a widely used support to contain and transfer different types of information, particularly for bank transactions, transport tickets, health information and for identification. Smart cards are usually stored in a plastic card, like a bank card. These cards usually contain a memory and a processor intended for storage and processing of data. The smart card is conventionally inserted into a card reader that makes an electrical contact with electrical contacts of the card.

2. Discussion of the Related Art

ISO standard 7816 defines the characteristics of the most widely used smart cards. This standard is thus used to define the characteristics of SIM cards or bank cards. ISO standard 7816-2 defines the number, function and position of electrical contacts on the surface of the chip with a connected interface. The English version of ISO standard 7816-2 calls these contacts "pins". Surface pins are denoted C1 to C8 in this standard. Pin C1, also denoted Vcc, is used to make a power connection through which the chip on the card is supplied with power. Pin C2, also referred to as RST or Reset, transmits an external command signal initiating a chip reinitialization instruction sequence. Pin C3, also denoted CLK, transmits a clock signal to the chip. Pin C5, also denoted GND, provides an electrical ground common to the integrated circuit of the chip and the device connected to the chip. Pin C6, also called Vpp, is used to program an EEPROM on the chip if there is one. Pin C7, also called the I/O pin, provides a communication channel between the connected device and the chip. ISO standard 7816-2 has not yet assigned any use to pins C4 and C8.

ISO standards 14443 and 15693 propose to include a passive antenna in the card so as to communicate with an external device by radio frequency.

ISO standard 14443 in particular defines a radio-frequency communication protocol that ideally can communicate at up to 20 centimeters from the antenna. However the communication distance provided by the antenna is limited. The communication speed is also limited by the modulation frequency.

ISO standard 15693 describes another communication protocol to communicate at a greater distance than with ISO standard 14443, but with a lower communication speed. The communication distance supplied is still relatively small.

In general, antennas of these smart cards have a limited range. Furthermore, their range is strongly affected by their environment. In general, the presence of metallic parts (particularly a battery or other electrical circuits of a device in which the card is placed) deteriorate the range of the card. Furthermore, some small cards (for example a SIM card) cause lower antenna performance.

Therefore there is a need for a communication process, a smart card and equipment solving one or several of these problems, and the invention is intended to satisfy this need.

SUMMARY OF THE INVENTION

The process according to the invention, complying with the generic definition given above, comprises the following steps, supply of equipment fitted with at least one antenna and at least two pins connected to the antenna; supply of a smart card with a chip supplied with at least two surface pins a processing module; a radio-frequency interface associated with the processing module and connected to the surface pins of the card, the surface pins of the card being coupled to the pins of the equipment; and transmission of electrical signals between the surface pins of the card and the antenna According to one variant, the supplied chip is in the format given in ISO standard 7816-2 and the surface pins of the card are pins C4 and C8.

The invention also relates to a smart card with a chip fitted with at least two surface pins and a processing module, also comprising a radio-frequency interface associated with the processing module and connected to the two surface pins.

According to one variant, the chip is in the ISO standard 7816-2 format and the surface pins of the card are pins C4 and C8.

According to yet another variant, the card is in the format defined in ISO standard 7816-1.

According to another variant, the card is in the format of a GSM standard.

The invention also relates to equipment with an antenna and a coupling interface that could be coupled to a smart card, in which: the coupling interface has two pins that could be coupled to surface pins of a so-called smart card; and the pins of the equipment are connected to the antenna.

According to one variant, the equipment pins can be coupled to pins C4 and C8 of a smart card in the ISO standard 7816-2 format.

According to another variant, the equipment is a cell phone.

According to another variant, the telephone has a body and a removable battery and the antenna is fixed to the removable battery.

According to another variant, the telephone has a body and a removable battery and the antenna is fixed to the body.

The equipment according to the invention can also be an automobile vehicle, a PDA, a smart card support or a storage device.

According to one variant of such an equipment, the antenna is active.

BRIEF DESCRIPTION OF THE DRAWINGS

The invention will be better understood after reading the following description and an examination of the Figures that accompany it. The Figures show.

DETAILED DESCRIPTION

The invention proposes to communicate with a smart card by coupling surface pins of the card with an antenna on a connected device. The smart card can then use the antenna of the connected device for contactless communication with other equipment. When the surface pins of the smart card are coupled to pins of the equipment connected to the antenna, electrical signals are emitted between the surface pins and the antenna.

Figure 1:
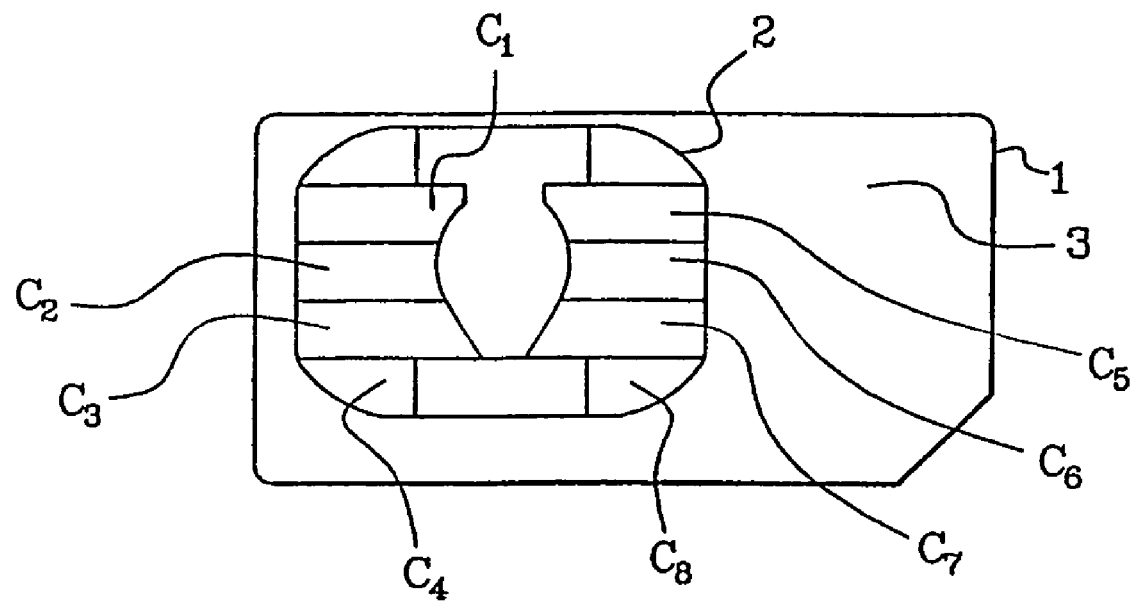
FIG. 1, a diagrammatic view of the geometry of a SIM card.

FIG. 1 diagrammatically shows the geometry of a SIM card in the format of a GSM standard. The SIM card is a particular example of a smart card, in which the card is in the format defined in the ISO generic standard 7816-1, and in which the chip is in the format defined in the ISO generic standard 7816-2. The card 1 has a contact interface 2 made on a card body 3. The contact interface 2 has surface pins C1 to C8 as defined in ISO standard 7816-2.

Figure 2:
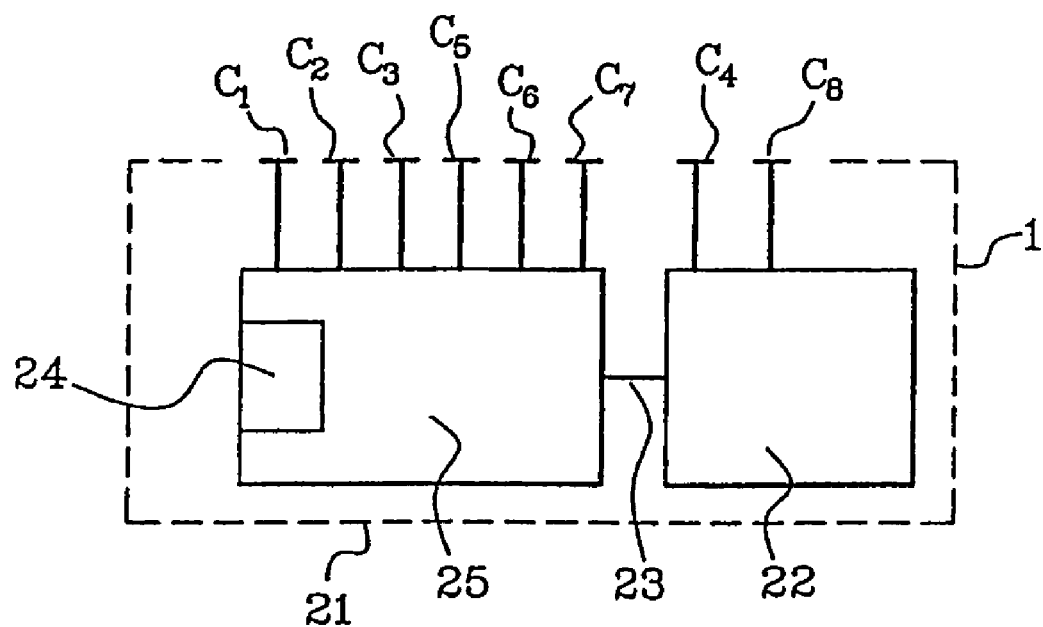
FIG. 2, a block diagram of a first variant of a chip according to the invention.
Figure 3:
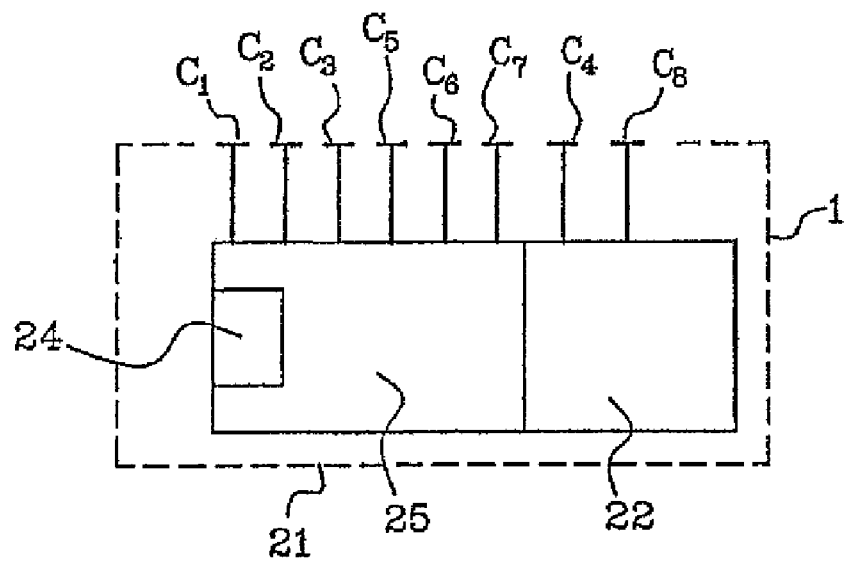
FIG. 3, a block diagram of a second variant of a chip according to the invention.

In the variants of chips 21 shown in FIGS. 2 and 3, a radio-frequency interface 22 is associated with a processing module 25. A processing module associated with a radio-frequency interface will cover both:
  the alternative in which the radio-frequency interface 22 is a module independent of the processing module, connected to the processing module 25, and
  the alternative in which the processing module 25 integrates the radio-frequency interface 22.

FIG. 2 shows a block diagram of the first alternative structure of the chip 21 placed in a card 1 according to the invention. The chip 21 comprises a processing module 25 connected to a radio-frequency interface 22 through an appropriate type of connection or link 23.

FIG. 3 shows a block diagram of the second alternative structure of a chip 21. In this alternative, the radio-frequency interface 22 is integrated into the processing module 25.

Using these variants, the processing module 25 is designed particularly to perform various typical logical functions of a smart card. In particular, an appropriate microcontroller can be used as a processing module 25. The processing module 25 is, for example, connected to surface pins C1 to C3 and C5 to C7, in a known manner. The radio-frequency interface 22 is connected to the surface pins C4 and C8. The radio-frequency interface 22 is designed to process or generate electrical signals at appropriate frequencies.

The chip 21 of the card 1 can thus generate radio-frequency electrical signals through the radio-frequency interface 22. As will be described in detail later, this structure enables the chip 21, and particularly the processing module 25, to use the antenna of an associated equipment to communicate by radio frequency. Therefore, the communication range of the smart card 1 is not limited by the dimensions of this card. Thus, a particular smart card, even the size of a SIM card according to the format of a GSM standard, can be used in many applications requiring significantly different communication ranges. The possible use of surface pins C4 and C8 according to ISO standard 7816-2 for the transmission of electrical signals with the outside would also be easy to implement since these pins already exist and are not assigned in this standard on the date that this application was submitted.

The radio-frequency interface 22 is designed to process or generate appropriate electrical signals for data communication between the chip 1 and outside equipment.

In the examples in FIGS. 2 and 3, the chip 21 has one or several memories 24. For example, these memories 24 are integrated into the processing module 25 of the chip 21. These memories 24 are designed to store different items of useful information. In particular, one or several memories 24 chosen from among ROM, RAM read access memories, flash memories, electrically erasable and programmable memories EEPROM, or any other type of appropriate onboard memory, can be used.

Although not described in detail, it is quite clear that the smart card can also include its own antenna in a manner known in itself, so that it can communicate with the outside without requiring the presence of an item of equipment providing it with an antenna.

Figure 4:
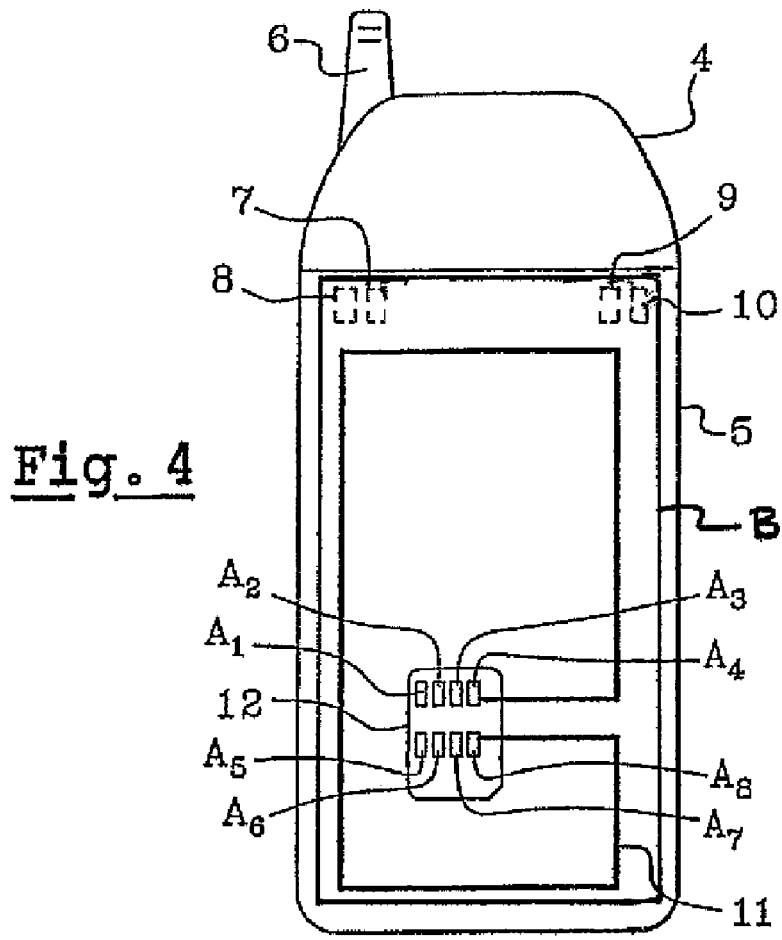
FIG. 4, a diagrammatic view of a cell phone according to the invention.

We will now describe operation of equipment cooperating with the smart card, for which an example is given in FIG. 4. The specific nature of equipment according to the invention is that it has a contact interface with two pins that can be coupled to surface contacts of a smart card 1 described above. The two pins of the equipment are connected to an antenna. This type of equipment enables the smart card 1 to use the antenna 11 through coupling of pins on the equipment and the card. This type of equipment can then increase the communication range of the smart card 1.

FIG. 4 shows a cell phone 4 designed to operate with a smart card 1 described above. A cell phone refers to any equipment that can perform the portable telephony function; therefore this term includes PDA (Personal Data Assistants), provided with a GSM function and any other similar equipment. The telephone 4 has a telephone body 5, a GSM communication antenna 6 and power supply contacts 7 to 10 designed to be coupled to a removable battery B, in a known manner. The body 5 also includes a housing 12 in which a smart card with a given format can be fitted. A coupling interface including pins A1 to A8 is arranged for example in the bottom of the housing 12. Pins A1 to A8 are arranged so that they can be coupled by electrical contact to the surface pins C1 to C8 respectively, on a smart card 1 inserted in the housing 12. For the reasons mentioned above, an equipment connection interface according to ISO standard 7816-2 will be used in preference.

Pins A4 and A8 on the equipment have a connection to an antenna 11. The antenna may be adapted to communicate in the predefined frequency bands, such as the carrier frequency bands specified in ISO standard 14443, standard 15693 or standard 18000. This antenna thus forms a resonant circuit with one or several chosen frequencies. The antenna 11 shown is made in the form of a track printed on a support but any type of appropriate antenna could also be envisaged. The antenna could also be provided with passive or active electronic components, in particular to make impedance matching. An amplifier could also be arranged on the connection of the antenna to the equipment pins.

In the variant of the telephone 4 shown, the antenna 11 is fixed to the telephone body 5. For example, the antenna 11 may be placed on a position providing it with optimum range, that can be determined by those skilled in the art.

The antenna 11 can also be implanted on a removable battery B of the cell phone. This arrangement would enable a user to replace a battery B to connect the smart card 1 to the antenna 11 of the telephone, keeping its original telephone. In particular, it would be possible to add or assign electrical pins on the phone to supply a connection to a smart card placed in the body, with an antenna 11 placed in the battery B. It would also be possible to implant a coupling interface to a smart card on a battery B and an antenna connected to the pins of this interface.

It would also be possible to envisage other types of equipment such as vehicles, cases or supports for smart cards, portable listening equipment or storage devices such as containers or cardboard boxes. In particular, an automobile vehicle can be envisaged fitted with an antenna connected to a smart card coupling interface located inside the passenger compartment. For example, the antenna could be adapted to communicate with a toll, to make a remote toll application. In particular, a subscription recorded on the card could be detected, or a debit could be recorded on an account associated with the smart card. It would also be possible to envisage card cases or supports fitted with an antenna connected to a smart card coupling interface. Equipment provided with such a coupling interface could also include an active antenna, so as to increase the communication range of the smart card.

The corresponding impedances of the antenna of the equipment and the surface pins C4 to C8 of the smart card are adapted to have a resonant frequency chosen for the modulation frequency band chosen.

The communication process associated with such a smart card and such equipment includes the following steps:
 during a connection step:
  equipment is supplied fitted with an antenna and at least two pins connected to the antenna;
  a smart card is provided with a chip fitted with at least two surface pins, a processing module and a radio-frequency interface associated with the processing module and connected to the surface pins of the card, the surface pins of the card being coupled to the pins of the equipment;
  electrical signals are transmitted between the card pins and the antenna in a subsequent transmission step.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not intended as limiting. The invention is limited only as defined in the following claims and the equivalents thereto.

What is claimed is:

1. A communication process comprising:
 providing a cell phone having a body;
 fitting a removable battery adapted to provide primary electrical power to the body of the cell phone, the removable battery having at least one antenna fixed directly to the removable battery, and at least two pins connected to the antenna;
 coupling a smart card to the cell phone, the smart card comprising at least two surface pins and the smart card having a chip comprising a processing module and a radio-frequency interface, the radio-frequency interface being associated with the processing module and being connected to the surface pins of the smart card, wherein the antenna of the cell phone is external to the smart card;
 coupling the surface pins of the smart card to the pins of the cell phone; and
 transmitting electrical signals between the surface pins of the smart card and the antenna.

2. The process according to claim 1, wherein coupling a smart card to the cell phone comprises coupling a smart card formatted in ISO standard 7816-2 and coupling surface pins C4 and C8 to the pins of the cell phone.

3. A cell phone with a body, a removable battery for providing primary electrical power to the cell phone, an antenna, and a coupling interface coupleable to a smart card, wherein:
 the coupling interface has two pins coupleable to surface pins of a smart card; and
 the pins of the cell phone are connected to the antenna; and
 the antenna is fixed directly to the removable battery for providing primary electrical power to the cell phone.

4. The cell phone according to claim 3, wherein:
 the pins on the equipment can be coupled to pins C4 and C8 of a smart card in the ISO standard 7816-2 format.

5. The cell phone according to claim 3, wherein:
 the cell phone is a PDA.

6. A cell phone according to claim 3, wherein the antenna is active.

7. A communications process comprising:
 providing a cell phone comprising an antenna adapted to transmit and receive signals for use by the cell phone, the cell phone further comprising a removable battery that provides primary electrical power to the cell phone, wherein the antenna is fixed directly to the removable battery;
 coupling a smart card having a chip, a contact, a processing module, and a radio-frequency interface to the cell phone;
 associating the radio-frequency interface with the processing module;
 connecting the radio-frequency interface with the contact;
 connecting the contact of the smart card to the antenna; and
 transmitting electrical signals between the smart card and the antenna via the contact.

8. The process of claim 7, wherein coupling a smart card comprises providing the smart card with at least two unused surface contacts, wherein the process further comprises transmitting electrical signals between the at least two unused surface contacts and the antenna.

9. The process of claim 8, wherein coupling the smart card with the at least two unused surface contacts comprises:
 providing the smart card in ISO standard 7816 format; and
 providing the contacts as contacts C4 and C8 as defined by ISO standard 7816.

10. A communication system comprising:
 a smart card having a radio-frequency interface;
 a cell phone communicating with the smart card, the cell phone having an antenna adapted to transmit and/or receive signals for use by the cell phone, the radio-frequency interface of the smart card connected to the antenna of the cell phone wherein signals from the radio-frequency interface are transmitted to the antenna of the cell phone to increase a communication range of the smart card; and
 a removable battery electrically coupleable to the cell phone for providing primary electrical power to the cell phone, the antenna being fixed directly to the removable battery for providing primary electrical power to the cell phone.

11. The system of claim 10, further comprising at least two unused surface contacts, wherein the radio-frequency interface of the smart card is connected to the antenna via the at least two unused surface contacts.

12. The system of claim 11, wherein the smart card is in ISO standard 7816 format and wherein the contacts are C4 and C8 as defined by ISO standard 7816.

13. The system of claim 10, wherein the cell phone is a PDA.

* * * * *

UNITED STATES PATENT AND TRADEMARK OFFICE
CERTIFICATE OF CORRECTION

PATENT NO. : 7,583,980 B2 Page 1 of 1
APPLICATION NO. : 10/526033
DATED : September 1, 2009
INVENTOR(S) : Olivier Monsacre It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this

Fourteenth Day of September, 2010

David J. Kappos
*Director of the United States Patent and Trademark Office*